UNITED STATES PATENT OFFICE.

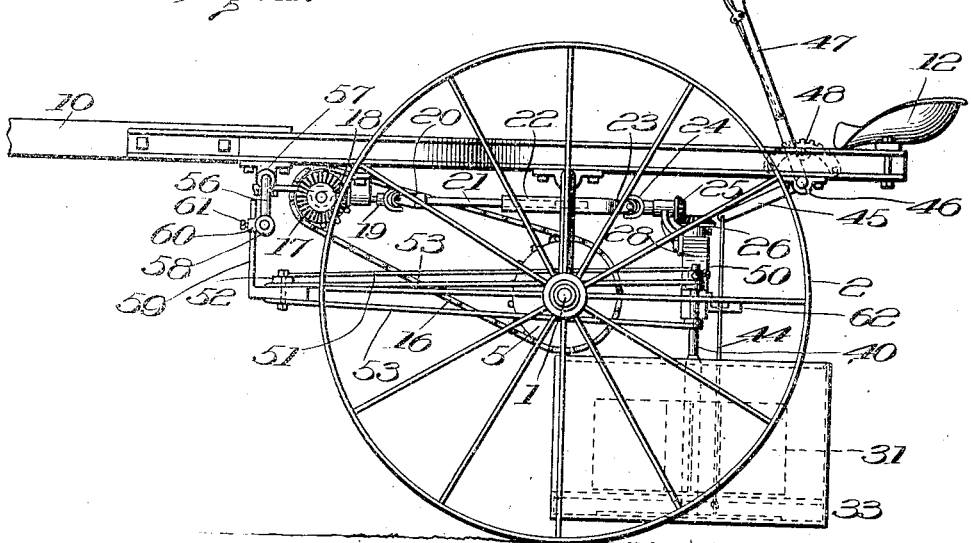
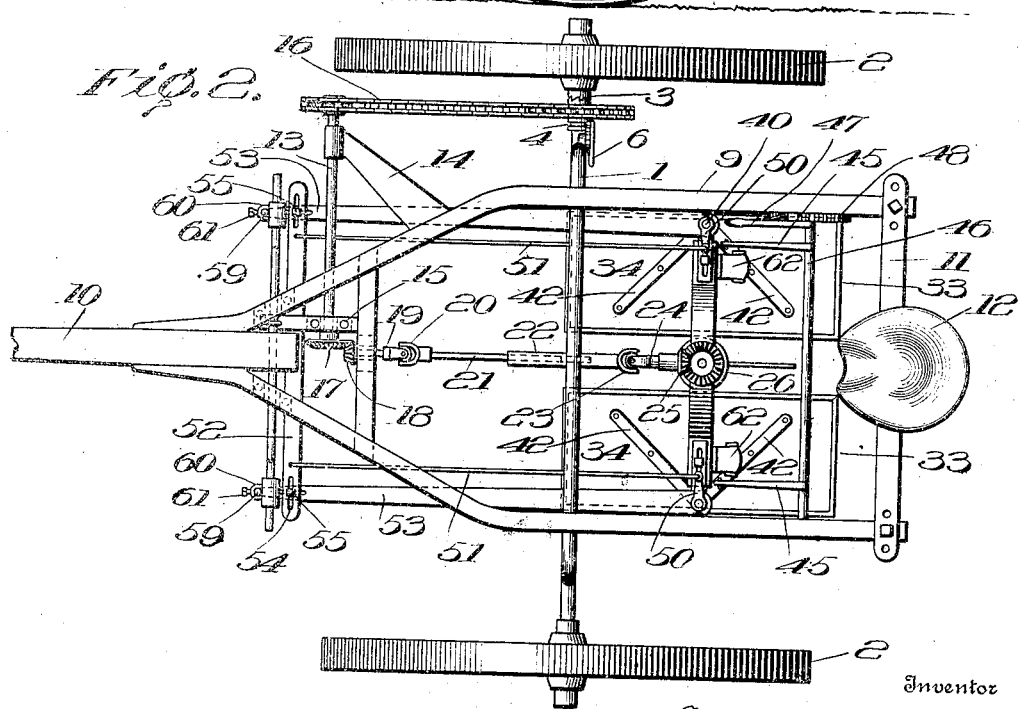

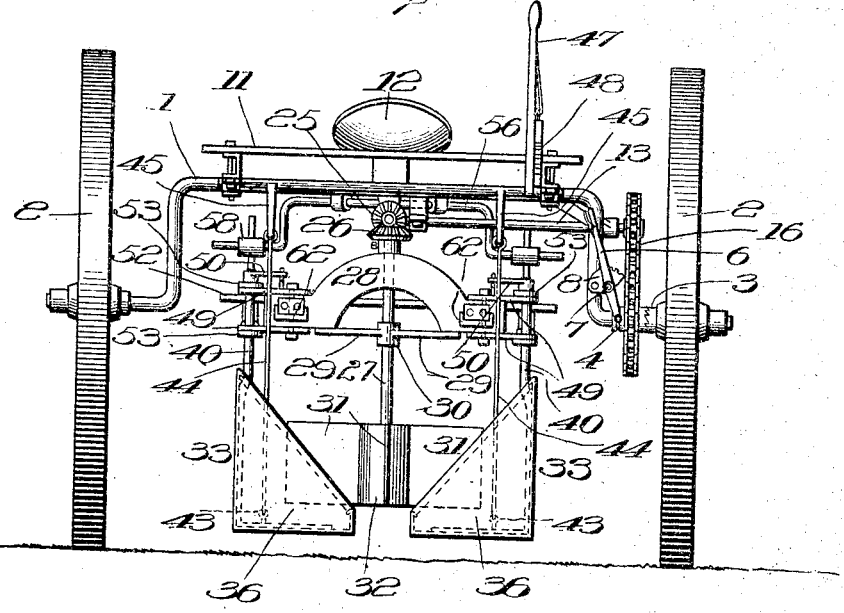
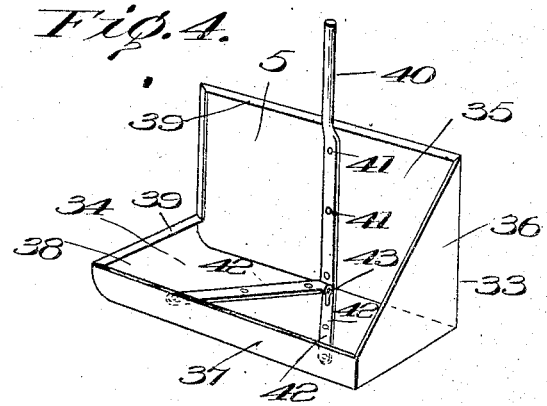

GEORGE LORAN EMERY, OF BERESFORD, SOUTH DAKOTA.

POTATO-BUG CATCHER.

932,454.  Specification of Letters Patent.  Patented Aug. 31, 1909.

Application filed November 18, 1908. Serial No. 463,281.

*To all whom it may concern:*

Be it known that I, GEORGE LORAN EMERY, a citizen of the United States of America, residing at Beresford, in the county of Union and State of South Dakota, have invented new and useful Improvements in Potato-Bug Catchers, of which the following is a specification.

This invention relates to potato bug catchers, and one of the principal objects of the same is to provide reliable and efficient means for sweeping the bugs off the vines into the trays or catchers and to provide means for raising and lowering the catchers and for adjusting them toward and from each other.

Another object of the invention is to provide a tray or catcher with bent edges to form stops to prevent the bugs from escaping from the tray or catcher.

Still another object of the invention is to provide a rotating beater provided with fan-like blades for sweeping the bugs from the vine and oppositely disposed catchers, said catchers and beater being adjustable, and means being provided for preventing rotation of the beater when the implement is driven from place to place.

These and other objects may be attained by means of the construction illustrated in the accompanying drawing, in which,—

Figure 1 is a side elevation of a potato bug catcher made in accordance with my invention. Fig. 2 is a plan view of the same. Fig. 3 is a rear end elevation. Fig. 4 is a detail perspective view of one of the trays or catchers. Fig. 5 is a detail sectional view on the line 5—5 of Fig. 4.

Referring to the drawing, the numeral 1 designates an arched axle upon which the ground wheels 2 are journaled. Upon the hub of one of the wheels 2 is a clutch member 3; and a sliding clutch 4 is connected to a sprocket wheel 5 and mounted upon the axle 1. A lever 6 pivoted at 7 is operated for throwing the clutch into and out of engagement, said lever being provided with a rack 8 for holding the same in adjusted position. Mounted on the axle 1 is a draft frame 9, to the front end of which a draft tongue 10 is secured. At the rear end a seat bar 11 is connected and provided with a seat 12. A shaft 13 journaled in a brace 14 and in a suitable bearing 15 is provided with a sprocket wheel over which the chain 16 passes, said chain engaging the sprocket wheel 5 on the axle 1. On the inner end of the shaft 13 is a beveled gear 17 which meshes with a pinion 18 on a shaft 19, the latter being provided with a universal joint 20 connected to a square rod 21, the rear end of which is mounted telescopically in a tubular shaft 22. The latter is also provided with a universal joint 23 connected to a short shaft section 24 provided with a pinion 25 which meshes with a beveled gear 26 mounted upon the upper end of a vertical shaft 27. The shaft 27 is mounted in an arched bar 28 provided with converging braces 29 terminating in a collar 30 through which said shaft projects. Mounted upon the lower end of the shaft 27 is a beater comprising four blades 31 and a hub 32 through which the shaft 27 projects.

The catchers or trays 33 each comprise a bottom 34, a back 35, an end brace 36, an upturned front flange 37 and an end flange 38. The marginal edges of the catchers are bent over at an angle, as at 39, to form stops to prevent the bugs from escaping from the catcher. For supporting the catchers each is provided with a shaft 40, the lower portion of which is flattened and secured by rivets 41 to the back 35 of the catcher. The terminal lower portion of the shaft is provided with diverging braces 42 secured to the bottom 34 of the catcher. An eye-bolt 43 is secured to one of the diverging members 42, and a connecting rod 44 is attached to the eye 43 and its upper end connected to an arm 45 projecting forwardly from a shaft 46 journaled under the draft frame 9. A lever 47 connected to the shaft 46 is provided with a rack 48. Each of the catchers is mounted to be moved vertically. The shaft 40 extends through guide plates 49 secured to the arched bar 28, and the upper end of the shaft 40 has a lever 50 secured thereto. A connecting rod 51 extends from the lever 50 to a front cross bar 52 adjustably secured to the side bars 53 by means of slots 54 and bolts 55. The side bars 53 at their rear ends are provided with bearings through which the shafts 40 pass. A double crank shaft 56 journaled in bearings 57 secured to the draft frame has mounted upon its ends collars 58 to which are connected the L-shaped frames 59, the vertical members of which are adjusted in sleeves 60 formed upon the collars 58, a set screw 61 serving to hold the vertical member in adjusted position. Foot rests 62 project rearwardly from the curved bar 28.

The operation of my invention may be briefly described as follows:—The catchers 33 may be raised and lowered by means of the lever 47, and the catchers may be adjusted toward and from each other and at the required angle by means of the connecting rods 51, the cross bar 52 and the levers 50. The lever 6 may be operated to throw the beater into and out of operation. The driver sitting in the seat 12 drives the implement over a row of potatoes. The blades 31 knock the bugs off the vines into the catchers 33, and the bugs are prevented from escaping by means of the overhanging flanges 39. In conveying the implement from the barn to the field the beater is thrown out of operation by means of the lever 6.

From the foregoing it will be obvious that my potato bug catcher is of simple construction, can be readily adjusted and lowered into and out of operation and is strong, durable and efficient.

I claim:—

1. A potato bug catcher comprising a wheeled frame, an arched bar, a vertical shaft mounted in said bar, a beater connected to said shaft and provided with radial blades, oppositely disposed catchers, shafts for suspending said catchers, levers connected to the upper ends of said shaft, means for adjusting said levers to regulate the angularity of said catchers, means for raising and lowering said catchers, and means for rotating said beater.

2. A potato bug catcher comprising a frame, an arched axle, wheels mounted on said axle, an arched bar, a vertical shaft mounted in said bar, a beater provided with radial blades connected to said shaft, a telescopic shaft mounted horizontally on said frame and provided with pinions, one at each end, means for rotating said shaft, a beveled gear on said vertical shaft, said gear engaging one of the pinions on the telescopic shaft, catcher receptacles disposed underneath the blades of said beater, means for raising and lowering said catcher receptacles, and means for adjusting said receptacles toward and from each other.

3. In a device of the character described, a catcher comprising a sheet metal receptacle having an extended back portion, an end member extending from said back to the body portion of said catcher, said body portion and back having inwardly bent marginal flanges thereon, and a supporting shaft connected to said catcher, said supporting shaft having flattened divergent lower ends secured inside said catcher, the front wall of said catcher being curved.

In testimony whereof I affix my signature in presence of two witnesses.

GEORGE LORAN EMERY.

Witnesses:
W. J. BULOW,
B. R. FORBES.